Dec. 29, 1931.   G. A. MITCHELL   1,838,432
CONTRACTIBLE FILM SPOOL
Filed May 8, 1929
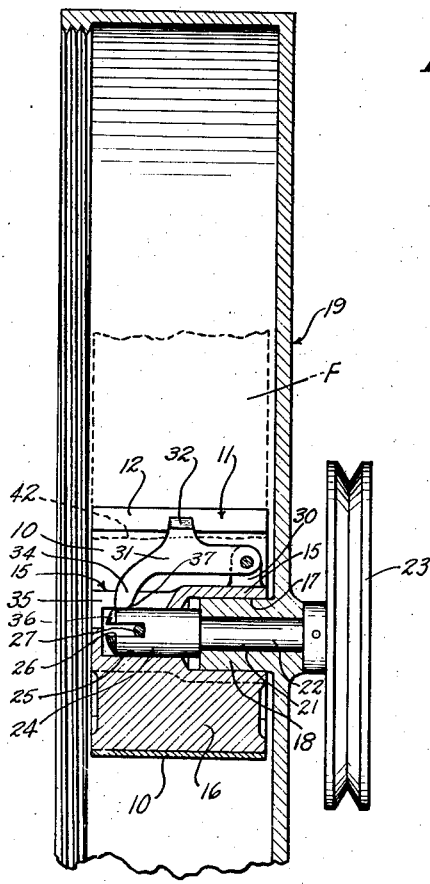
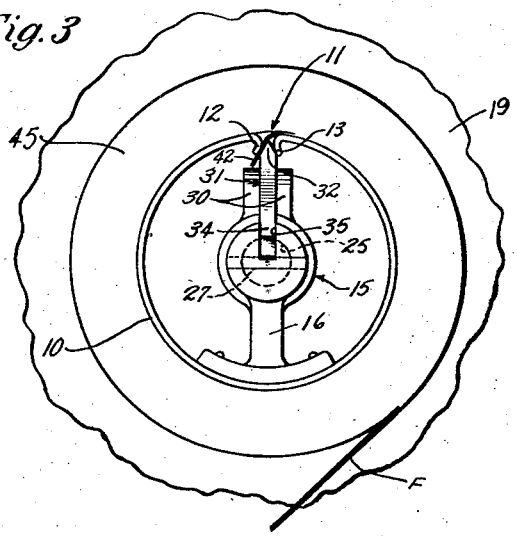
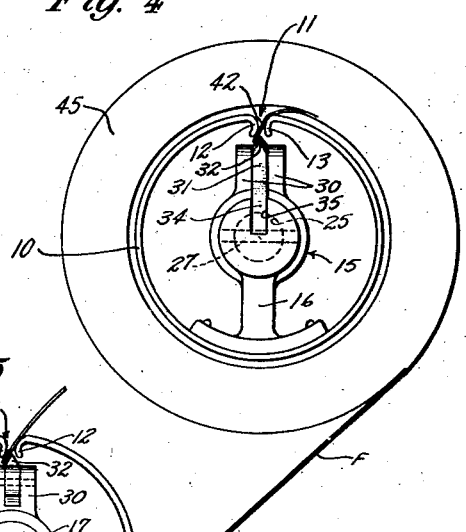
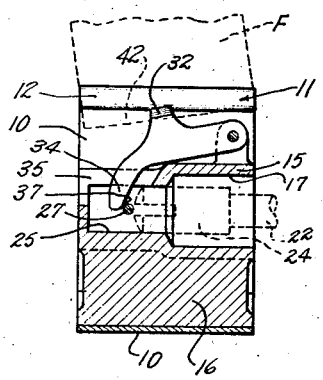
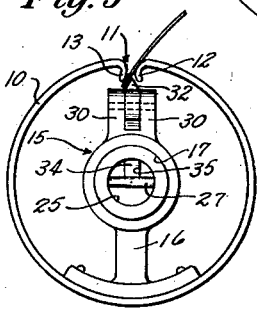
Inventor
George A. Mitchell.
Attorney.

Patented Dec. 29, 1931

1,838,432

UNITED STATES PATENT OFFICE

GEORGE A. MITCHELL, OF LOS ANGELES, CALIFORNIA, ASSIGNOR TO MITCHELL CAMERA CORPORATION, A CORPORATION OF DELAWARE

CONTRACTIBLE FILM SPOOL

Application filed May 8, 1929. Serial No. 361,441.

This invention has to do generally with a spool for motion picture film or the like, and more particularly with a motion picture film spool which is contractible to allow it to be withdrawn easily from a film roll wound thereon.

The ordinary rigid film spool when wound with a number of film convolutions is tightly bound therein, and the film roll cannot be removed from such a spool except with great difficulty. Heretofore, film spools have most commonly been driven through the medium of a spring belt, causing the film to reel up into a relatively loose roll which could be removed from the spool without comparative difficulty. This relatively loose roll was not objectionable when the roll did not carry over 250 feet of film, as has heretofore been standard practice; but with the introduction of sound pictures it has been found more desirable to make the rolls of a length of 1000 feet, and this in turn necessitates that the film be reeled much more tightly in order to form a stable film roll which will not telescope and fall apart. For this reason the usual spring driving belt has now commonly been replaced with a non-extensible, non-slipping leather or fabric belt, with the result of a very much tighter roll. It is found, however, that the spool upon which this larger and tighter roll is carried is so tightly bound therein as to be extremely difficult of removal, and sometimes it is not possible to remove the spool without entirely rewinding the film.

It is therefore a primary object of the present invention to provide a film spool with means whereby a film roll tightly wound thereon may easily be removed.

Generally speaking, this is accomplished by providing a film-receiving member of substantially cylindric external form, which is expansible circumferentially, the member being expanded before the film is reeled thereon, and thereafter contracted to allow the film roll to be removed. In the preferred embodiment there is provided a split tubular member of resilient material, which member is resiliently expanded by forcing a wedge-member into its split before the film is reeled on. To remove the film roll, the wedge-member is removed and the tubular member springs back resiliently to its original contracted position, when the spool may easily be slipped off. Considered in its broadest aspect, however, the invention is not limited to this arrangement, as it is equally possible, although not preferred, to provide a tubular film-receiving member adapted normally to assume the expanded position, with means for contracting the member to allow the roll to be removed.

The invention, in its preferred form, provides means actuated by a mounting or driving shaft as the hub of the spool is slipped thereover, for expanding the film-receiving member, as described in the preceding paragraph.

Another feature of advantage of the film spool provided by the present invention is the novel means for securing the end of the film thereto. According to the preferred arrangement, the end of the film is slipped within the split of the tubular film-receiving member, and gripped therein at a single point only. The film end is thus pivotally held by the spool, and if originally gripped at an angle will instantly adjust itself to a direction at true right angles to the spool axis, in which there will be no tendency for the film to work off one edge of the spool as it is reeled thereon. This is a feature of great importance, as it is well known that according to the usual method of securing the film end to the spool, which comprises bending over the end of the film and inserting it in a split in the spool, if the film end is not bent over at an exact right angle with respect to the spool axis, the film will immediately start to run off the edge of the spool, and will never reel properly—but will continue to run first off one edge of the roll and then off the other.

It is a further object of the present invention to provide a film spool having the above described characteristics, and which is simple in construction, effective in use and convenient in operation.

Other objects and features of the invention will be gathered from the following detailed description of a present preferred embodiment, reference for this purpose being had to the accompanying drawings, in which:

Figure 1 is a vertical cross-section showing the film spool in position in a film magazine;

Figure 2 is a similar section of the spool, showing it removed from the magazine;

Figure 3 is an end elevation of the spool, showing the spool expanded and a film roll wound thereon;

Figure 4 is an end elevation of the spool, showing the spool contracted to be removed from the film roll; and Figure 5 is an elevation of the end of the spool opposite to that shown in Figure 4.

Referring now to the drawings, the spool is provided with a tubular film-receiving portion 10 split laterally at 11, with its meeting ends 12 and 13 turned in, as shown. Concentrically disposed within this tubular member 10 is a hub portion 15, which is formed upon the inner end of a bracket 16 secured to the inner surface of member 10 at a point opposite its split 11. Hub 15 has a bore 17 within which the tubular axle member 18 of a magazine 19 is taken for rotative support of the spool (see Figure 1). Journaled in bore 21 of axle member 18 is a spindle 22, and secured on the right hand end of spindle 22 outside of magazine 19 is a drive pulley 23. Spindle 22 has formed on its left hand end adjacent the end of tubular member 18 an enlarged head 24, which is adapted to be taken within a reduced concentric bore 25 of hub 15 extending rearwardly therein from bore 17. The outer end of head 24 is slotted at 26 to take a cross-pin 27 provided in bore 25 of hub 15 for the purpose of drivingly connecting pulley 23 with the spool.

The right hand end of hub 15, as viewed in Figures 1 and 2, is provided on its outer surface, just below the split 11 in member 10, with a pair of lugs 30, between which is pivotally mounted the end of a wedge-arm 31. Arm 31 is provided, midway between the ends of the spool, with an outwardly extending wedge-portion 32, which is adapted to be forced outwardly between the inturned ends 12 and 13 of the cylindric member 10; this wedging action causing said ends to be spread apart and member 10 to be expanded, as hereinafter more fully explained. Ends 12 and 13 are preferably bent slightly backward, as shown, to conform to the beveled surfaces of wedge 32.

The free movable end 34 of pivoted arm 31 is curved inwardly toward the spool axis, and is adapted to extend, when arm 31 is moved radially inward (see Figure 2), within the bore 25 of hub 15 through a radial slot 35 provided therein. The other end of spindle-head 24 is provided with a cam nose 36, which, as the spool is placed in the magazine and its hub is slipped over spindle-head 24, contacts a cam surface 37 of the movable end 34 of arm 31; and then as the spool is forced further on over the spindle the cam nose moves arm 31 radially outward and passes thereunder, the inner end 34 of the arm riding on the side surface of head 24, as shown in Figure 1.

This last described movement of arm 31 is the movement that causes wedge 32 to be forced between the inturned ends 12 and 13 of tubular member 10, as previously referred to. Member 10, which may be comprised of any suitable resilient material, thus, in the preferred embodiment, normally takes the contracted position illustrated in Figures 2, 4 and 5, and is resiliently expanded to the illustrated positions of Figures 1 and 3 by outward movement of arm 31, which in turn causes circumferential expansion of the tubular member by spreading or wedging apart its split. When the spool is removed from the magazine, spindle-head 24 is removed from contact with the inner end of arm 31 and the tubular member is thereupon enabled to contract, by virtue of its resiliency, to its original normally contracted position, illustrated in Figures 2, 4 and 5. As the tubular member contracts its inturned wedge-receiving ends close toward each other and force the wedge-portion 32 of arm 31 inwardly and out of the split, thus moving the inner end 34 of the arm back into hub-bore 15, as in Figure 2, where it is in position to be contacted by the spindle when the spool is again mounted thereon.

The co-operation of wedge 32 with the inturned ends 12 and 13 of member 10, in addition to the described function of expanding member 10, serves also to secure the inner end of the film to the spool in a novel manner, as will now be described. When a film is to be reeled on the spool, the end 42 of the film F is first slipped into the split 11 of tubular member 10 to one side of wedge 32, as in Figures 2 and 5. The spool is then mounted in the magazine, and spindle-head 24, in slipping within bore 15 to drivingly engage cross-pin 27, operates as described to force wedge 32 outwardly between the inturned split-ends 12 and 13. Wedge 32 now not only expands member 10, but also, as will be seen from Figure 3, grips the film end between itself and one of the ends 12 and 13. Wedge 32 is preferably made relatively narrow in width so that the film is pivotally held thereby and is automatically adjustable in direction after being thus gripped. Thus if the film be originally inserted and gripped in the spool at an angle, as indicated in Figure 2, the film will pivot at wedge 32 to take a direction at true right angles to the spool axis, as indicated in Figure 1, thereby insuring that the film will reel properly without running off one edge of the spool.

When a film roll 45 has been reeled upon the spool and the spool is removed from the magazine, spindle-head 24 is removed from contact with arm 31, which is thereupon allowed to move inward or out of wedging position. The tubular member 10 then springs back to its normal contracted position, as illustrated in Figure 4, when the spool may easily be withdrawn from the roll.

It will be understood the drawings and description are to be considered merely as illustrative of and not restrictive on the broader claims appended hereto, for various changes in design, structure and arrangement may be made without departing from the spirit and scope of said claims.

I claim:

1. In combination with a spindle, a film spool adapted to be mounted on said spindle, said film spool including an expansible film-receiving member, said member normally assuming a yielding contracted position, and expanding means for said member actuated by the spindle as the spool is mounted on the spindle.

2. In combination with a spindle, a film spool adapted to be mounted on said spindle, said spool including a split tubular film-receiving member of resilient material, and means actuated by virtue of mounting the spool on the spindle for resiliently expanding said tubular member circumferentially.

3. In combination with a spindle, a film spool adapted to be mounted on said spindle, said film spool including a split tubular film-receiving member of resilient material, a wedge member movably mounted on said spool and having a wedge portion adapted, by virtue of mounting said spool on said spindle, to be forced within said split to resiliently expand said tubular member circumferentially.

4. In combination with a spool-driving spindle, a film spool adapted to be slipped on and drivingly connected with said spindle, said film spool including a split tubular film-receiving member of resilient material, a hub portion mounted within said tubular member and having a spindle-bore concentric therewith within which said spindle is adapted to be taken, means for drivingly connecting said spindle with said hub, a wedge-member movably mounted within said tubular member, said wedge-member having a portion adapted to extend into the spindle bore of the said hub and to be contacted and moved out of said bore by the spindle as the hub is slipped thereover, and a wedge portion on said wedge-member adapted to be forced, by virtue of said wedge-member movement out of the spindle-bore, within the split of said tubular member.

5. In combination with a spindle, a film spool adapted to be mounted on said spindle, said spool including a split tubular film-receiving member, the split in said tubular member being adapted to take the end of a film strip, and means actuated by virtue of mounting the spool on the spindle for securing said film-strip end in said split.

6. In combination with a spool-driving spindle, a film spool adapted to be slipped on and drivingly connected with said spindle, said spool including a split tubular film-receiving member, the split in said tubular member being adapted to take the end of a film strip, a wedge member movably mounted within said tubular member and having a wedge portion adapted to be forced within said split to grip the film therein, said wedge member being moved to film gripping position by contact with the spindle when the spool is slipped thereon, and being released from film gripping position when the spool is withdrawn from the spindle.

7. In combination with a spool-driving spindle, a film spool adapted to be slipped on and drivingly connected with said spindle, said spool including a split tubular film-receiving member, the split in said tubular member being adapted to take the end of a film strip, a wedge member movably mounted within said tubular member and having a relatively narrow wedge portion adapted to be forced within said split to grip the film therein substantially at a single point about which the film may pivot, and to expand the tubular member, said wedge member being moved to film gripping position by contact of the spindle when the spool is slipped thereon, and being released from film gripping position when the spool is withdrawn from the spindle.

8. In a film spool, a hub, a split resilient film-receiving drum mounted on the hub, said drum assuming a normal unstressed position with the gap provided at said split wide enough for insertion of a film, a wedge mounted on the hub and adapted to be wedged out to open the gap and to grip the film, said wedge located near the longitudinal center of the gap and being of short length relative to the length of the drum so as to grip the film substantially at a point about which the film may pivot.

9. In combination with a spool-driving spindle, a film spool adapted to be slipped on and drivingly connected with said spindle, said film spool including a split tubular film-receiving member of resilient material, a hub portion mounted within said tubular member and having a spindle-bore concentric therewith within which said spindle is adapted to be taken, a wedge-member pivoted on said hub portion, said wedge-member having a portion adapted to extend into the spindle bore of said hub and to be engaged and moved out of said bore by the spindle as the hub is slipped thereon, and a wedge portion on said wedge-member adapted to be forced, by virtue of said wedge-member movement out of the spindle-bore, within the split of said tubular member.

10. In combination with a spool-driving spindle, a film spool adapted to be slipped on and drivingly connected with said spindle, said spool including a split tubular film-receiving member, a wedge member movably mounted within said tubular member and having a wedge portion adapted to be forced within said split to expand said tubular member, said wedge member being moved to expanding position by engagement of the spindle when the spool is slipped thereon, and being released from expanding position when the spool is withdrawn from the spindle.

In witness that I claim the foregoing I have hereunto subscribed my name this 19 day of April, 1929.

GEORGE A. MITCHELL.